US011320457B2

(12) United States Patent
Herfst et al.

(10) Patent No.: US 11,320,457 B2
(45) Date of Patent: May 3, 2022

(54) SYSTEM AND METHOD OF PERFORMING SCANNING PROBE MICROSCOPY ON A SUBSTRATE SURFACE

(71) Applicant: Nederlandse Organisatie voor toegepast-natuurwetenschappelijk onderzoek TNO, 's-Gravenhage (NL)

(72) Inventors: Roelof Willem Herfst, Capelle aan den IJssel (NL); Anton Adriaan Bijnagte, Tricht (NL); Jan Jacobus Benjamin Biemond, Barendrecht (NL); Klara Maturova, Pijnacker (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/261,494

(22) PCT Filed: Jul. 24, 2019

(86) PCT No.: PCT/NL2019/050482
§ 371 (c)(1),
(2) Date: Jan. 19, 2021

(87) PCT Pub. No.: WO2020/022893
PCT Pub. Date: Jan. 30, 2020

(65) Prior Publication Data
US 2021/0318353 A1 Oct. 14, 2021

(30) Foreign Application Priority Data

Jul. 24, 2018 (EP) .................................. 18185282

(51) Int. Cl.
*G01Q 60/30* (2010.01)
*G01Q 10/06* (2010.01)
*G01Q 40/02* (2010.01)

(52) U.S. Cl.
CPC ........... *G01Q 60/30* (2013.01); *G01Q 10/065* (2013.01); *G01Q 40/02* (2013.01)

(58) Field of Classification Search
CPC ....... G01Q 60/30; G01Q 10/065; G01Q 40/02
(Continued)

(56) References Cited

U.S. PATENT DOCUMENTS 6,178,653 B1 * 1/2001 Griffith ................ G01B 11/002
33/502
2003/0185967 A1 10/2003 Eby et al.
(Continued)

FOREIGN PATENT DOCUMENTS

EP 3258275 A1 12/2017

OTHER PUBLICATIONS

European Patent Office, International Search Report in corresponding International Application No. PCT/NL2019/050482, dated Oct. 15, 2019 (2 pages).

*Primary Examiner* — Nicole M Ippolito
(74) *Attorney, Agent, or Firm* — Leydig, Voit & Mayer, Ltd.

(57) ABSTRACT

The invention is directed at a method of performing scanning probe microscopy on a substrate surface using a scanning probe microscopy system. A probe tip and substrate surface are moved relative to each other in one or more directions parallel to the scanning plane to position the probe tip to a scanning position on the substrate surface with the probe tip; a displacement is measured by an encoder of said probe tip in said one or more directions; and a fiducial pattern is provided fixed relative to the substrate surface, said fiducial pattern having a scannable structure that is scannable by said probe tip and said structure forming a grid of fiducial marks in said one or more dimensions; said grid dimensioned to allow for measuring placement deviations of
(Continued)

the probe tip relative to the probe head by identifying one or more fiducial marks in the fiducial pattern.

16 Claims, 4 Drawing Sheets

(58) Field of Classification Search
USPC .......................... 850/1, 2, 3, 4, 5, 6, 7, 8, 9
See application file for complete search history.

(56) References Cited

U.S. PATENT DOCUMENTS

| 2010/0175155 A1* | 7/2010 | Sahin | G01Q 60/34 |
| | | | 850/6 |
| 2018/0275165 A1* | 9/2018 | Zumwalt | G01Q 40/00 |
| 2018/0306837 A1* | 10/2018 | Sadeghian Marnani | |
| | | | G01Q 60/32 |

* cited by examiner

SYSTEM AND METHOD OF PERFORMING SCANNING PROBE MICROSCOPY ON A SUBSTRATE SURFACE

CROSS-REFERENCE TO RELATED APPLICATIONS

This patent application is a U.S. National Phase of PCT International Application No. PCT/NL2019/050482, filed Jul. 24, 2019, which claims priority to European Application No. 18185282.3, filed Jul. 24, 2018, which are both expressly incorporated by reference in their entireties, including any references contained therein.

FIELD OF THE INVENTION

The present invention is directed at a method of performing scanning probe microscopy on a substrate surface using a scanning probe microscopy system, the system including at least one probe head, the probe head comprising a probe tip arranged on a cantilever and a tip position detector for determining a position of the probe tip along a z-direction transverse to an scanning plane, the method comprising positioning the at least one probe head relative to the substrate surface.

The invention is further directed at a scanning probe microscopy system for performing microscopy on a substrate surface, the system including at least one probe head, the probe head comprising a probe tip arranged on a cantilever and a tip position detector for determining a position of the probe tip along a z-direction transverse to an scanning plane, wherein the system comprises a positioning structure for positioning the at least one probe head relative to the substrate surface.

BACKGROUND

Scanning probe microscopy (SPM) devices, such as atomic force microscopy (AFM) devices, are for example applied in the semiconductor industry for scanning of semiconductor topologies on a surface. Other uses of this technology are found in biomedical industry, nanotechnology, and scientific applications. In particular, AFM may be used for critical dimension metrology (CD-metrology), particle scanning, stress- and roughness measurements. AFM microscopy allows visualization of surfaces at very high accuracy, enabling visualization of surface elements at subnanometer resolution.

As a result of the high accuracy, conventional and available SPM devices are to be controlled precisely, and contain accurate and sensitive measuring equipment, as well as positioning and scanning equipment arranged for supporting the very high (e.g. nanometer) resolution. Correct calibration of the device parts and the use of a high resolution positioning feedback system enable the SPM device to provide the required accuracy. In an AFM the exact position of the tip attached to an AFM cantilever may shift a bit after a new cantilever has been loaded. In addition to this, a probe tip may be shifted when measuring with different tilt angles of the cantilever. Such an angle change may shift the tip a bit as well. This makes navigation to a specific structure on a sample, or finding it back difficult. The invention aims to determine the exact position of the tip with respect to the measurement systems coordinate system. This way, previously measured structures can be found back exactly even after tip exchange or angle change.

SUMMARY OF THE INVENTION

It is an object of the present invention to provide a method of performing scanning probe microscopy that enables to be applied to large substrate surfaces without trade-off in terms of accuracy.

To this end, there is provided herewith a method of performing scanning probe microscopy on a substrate surface using a scanning probe microscopy system, the system including at least one probe head, the probe head comprising a probe tip arranged on a cantilever and a tip position detector for determining a position of the probe tip along a z-direction transverse to an scanning plane, the method comprising:
moving the probe tip and the substrate surface relative to each other in one or more directions parallel to the scanning plane to position the probe tip to a scanning position on the substrate surface with the probe tip;
measuring by a displacement encoder a displacement of said probe tip in said one or more directions; and
providing a fiducial pattern fixed relative to the substrate surface, said fiducial pattern having a scannable structure that is scannable by said probe tip and said structure forming a grid of fiducial marks in said one or more dimensions; said grid dimensioned to allow for measuring placement deviations of the probe tip relative to the probe head by identifying one or more fiducial marks in the fiducial pattern.

The fiducial pattern provides an absolute encoding of the substrate, in particular, relative to a substrate stage. This absolute encoder can be scanned by the probe tip itself. The resulting image is decoded so that position coordinates can be extracted from this. By integrating such an encoder with the substrate holder it is usable for alignment and position calibration purposes.

The probe tip may be moved by a positioning structure that is for example a positioning arm or an extendible arm which enables to move the probe head (or multiple probe heads simultaneously or consecutively) relative to the substrate surface towards desired landing position.

In accordance with a further embodiment, the displacement encoder measures a distance of the probe tip relative to at least one of a group comprising: a surface of a metrology frame, a surface that is statically connected to a metrology frame, and/or a two-dimensional optical encoder surface. In accordance with a preferred embodiment of the present invention, the displacement encoder is a two-dimensional optical encoder that is fixed to a metrology frame of the microscopy system. The two-dimensional optical encoder is designed for being absolutely static relatively to the metrology frame of the microscopy system. Moreover, the two-dimensional optical encoder is accurately calibrated such that it provides a highly reliable reference frame that can be used during scanning of the substrate surface. The two-dimensional optical encoder may comprise single encoder element, or may be formed of a plurality of encoder elements that are arranged contiguously such as to span a larger surface. An optical encoder may comprise an optical grating that cooperates with an encoder device on the (at least one) probe. The encoder enables to determine the exact position of the probe head based on the regular structure of the grating. Such a grating surface is usually a highly sensitive surface, and any irregularities, such as even the smallest scratches or contaminations, may cause the grating surface to be no longer usable. For example, the encoder uses the regular structure of the grating as a reference, by counting the grating structures that have passed during movement of the encoder starting from a specific reference. Any irregularity may disrupt such counting, thereby destroying the accuracy of the reference.

In accordance with a further embodiment of the present invention, the step of moving the probe tip and the substrate surface relative to each other is performed by the probe head comprising a 'short stroke' actuator for moving the cantilever relative to the probe head in a direction parallel to the scanning plane for performing the scanning of the substrate surface. An actuator of this type only requires a very small stroke for spanning only the surface of the image to be made. Sufficiently accurate actuator systems are available for use in a method in accordance with this embodiment.

In accordance with a further aspect of the present invention, there is provided a scanning probe microscopy system for performing scanning probe microscopy on a substrate surface using a scanning probe microscopy system, the system including:
- at least one probe head, the probe head comprising a probe tip arranged on a cantilever and a tip position detector for determining a position of the probe tip along a z-direction transverse to an scanning plane,
- an actuator for moving the probe tip and the substrate surface relative to each other in one or more directions parallel to the scanning plane to position the probe tip to a scanning position on the substrate surface with the probe tip;
- a displacement encoder form measuring a displacement of said probe tip in said one or more directions; and
- a fiducial pattern fixed relative to the substrate surface, said fiducial pattern having a scannable structure that is scannable by said probe tip and said structure forming a grid of fiducial marks in said one or more dimensions; said grid dimensioned to allow for measuring placement deviations of the probe tip relative to the probe head by identifying one or more fiducial marks in the fiducial pattern. Specific embodiments of such a scanning probe microscopy system are described herein, and are referred to in the enclosed claims.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
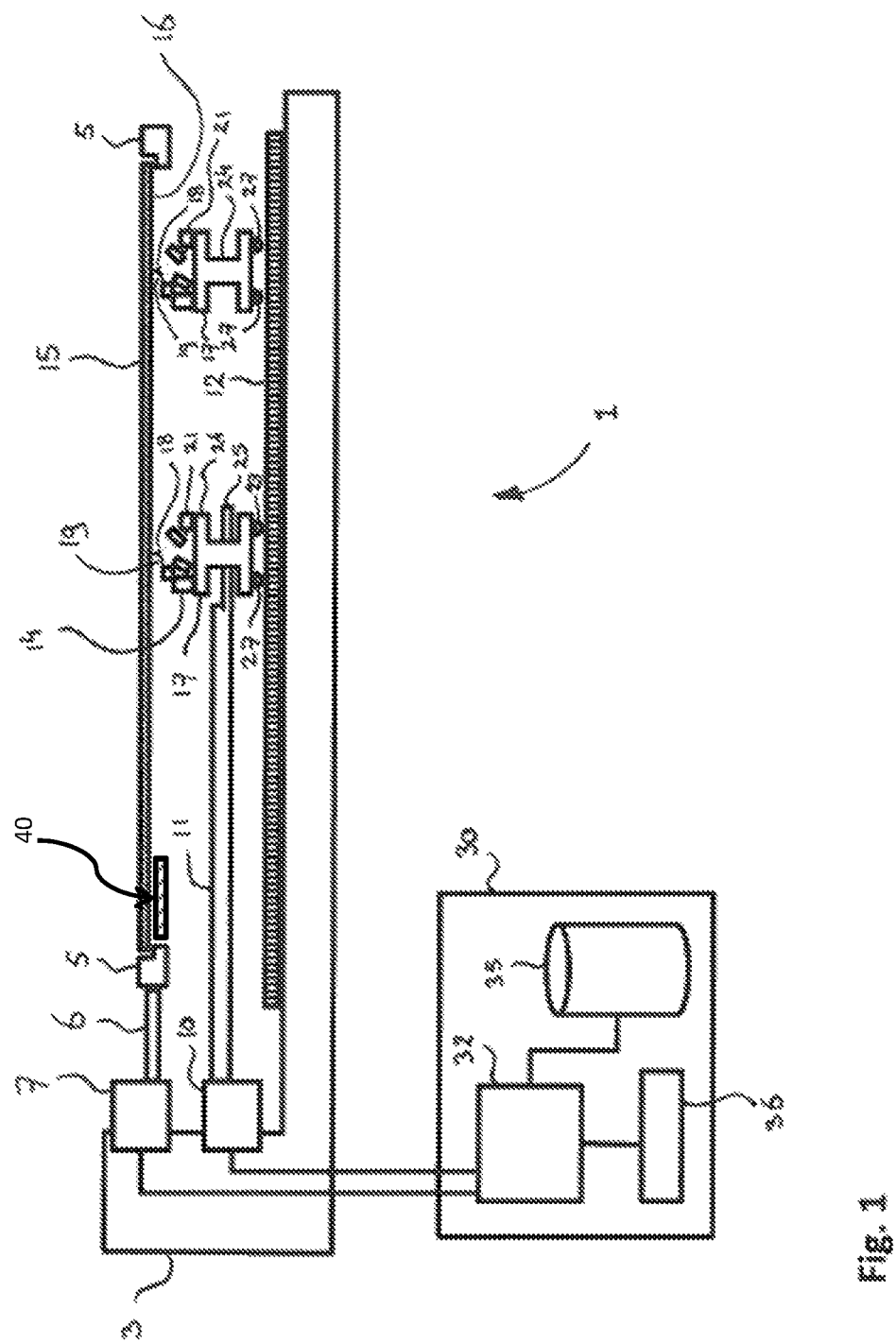
FIG. 1 schematically illustrates a scanning probe microscopy system in accordance with the present invention, wherein the method of the present invention may be applied.

FIG. 1 schematically illustrates a scanning probe microscopy (SPM) system 1 of the present invention. The SPM system 1 is suitable for being used in combination with the method of performing scanning probe microscopy in accordance with the present invention. The SPM system 1 comprises a metrology frame 3. The metrology frame provides a solid fixed base for the system. For obtaining the desired accuracy, the metrology frame is preferably kept free from any vibrations, and ideally also temperature changes within or in the environment of the metrology frame 3 are ruled out as much as possible.

A substrate holder 5 for carrying a substrate 15 such as a wafer, is connected to an XY substrate holder actuator 7 by means of a substrate holder arm 6. The substrate holder actuator 7 may be a system that allows to move the substrate holder 5, and therewith the substrate 15, in the X and Y directions, i.e. the directions parallel to the substrate 15. In FIG. 1, the substrate holder actuator 7 is illustrated as a single actuator element. Although the skilled person may appreciate that the substrate holder actuator may be implemented in a number of different manners, allowing the X and Y movements to be performed by a single actuator; other manners of implementing the substrate holder actuator functionality may comprise two (or more) actuators. For example, a separate X- and Y-actuator may be provided; also, for providing actuation in an X-direction a long stroke actuator may cooperate with a short stroke actuator in well known fashion. Also, the substrate holder 5 may be fixed relative to the metrology frame 3; and all movements are provided by moving the probe head carrier 24 in a long stroke and the probe tip 18 in a short stroke.

Back to FIG. 1, the substrate 15 comprises a substrate surface 16 that requires to be scanned by the scanning probe microscopy system 1. The scanning probe microscopy system 1 may comprise one or more probe heads 17. The probe heads 17 may be placed at various locations relative to the substrate surface 16 using a positioning structure. The positioning structure comprises a positioning actuator 10 and an extendible arm 11. The extendible arm 11 comprises an engagement element 25 that can be used for engaging with a probe head 17 for placement thereof relative to the substrate surface in a long stroke.

The probe heads 17 comprise, to this end, a probe head carrier 24 that cooperates with the engagement element 25. The probe head carrier 24 comprises the cantilever actuator 14 to which the probe comprising the cantilever 19 and the probe tip 18 are attached. A short stroke actuator (not shown) may be provided on the probe head carrier 24 to move the cantilever 19 and probe tip 18 in a short stroke relative to the probe head carrier 24 in a direction parallel to the scanning plane for performing the scanning of the substrate surface. The cantilever actuator 14 allows actuation of the probe in the Z direction, i.e. the direction perpendicular to substrate surface 16, preferably by means of the vibration of the probe tip 18 in the Z direction. During scanning, by vibrating the probe tip and bringing the probe tip very close to the substrate surface 16, the substrate surface 16 can be scanned and any nanostructures present on the substrate surface 16 will influence the deflection of the probe tip. This probe tip deflection is measured using a tip position detector 21 comprising an interferometer.

In accordance with a method of the present invention, during scanning of the substrate surface 16 the probe head 17 is placed on a static carrier surface. In FIG. 1, this is achieved by placing the probe head carrier 24 with landing feet 27 on encoder 12. The encoder 12 may be provided, by a highly sensitive optical grating, which is accurately calibrated such as to provide a reference structure that is usable for accurately determining the exact position and orientation of the probe head 17 on the metrology frame 3. Alternatively, but not limited thereto, encoders may be provided in extendible arm 11 and/or substrate holder arms 6. By having this information, also the exact position of the probe tip 19 with respect to the metrology frame is known. The encoder 12, for this reason, is highly sensitive and prone to any scratching or contamination. To determine the exact position on the metrology frame 3, a counting may be performed on the regular structure of the grating periodicity of the encoder 12. Instead of or in addition to counting grating structures, the encoder surface may comprise other references that may be interpreted for determining an exact position. As may be appreciated, a scratch on the surface may disrupt the interpretation of the positioning reference, and thereby introduces an inaccuracy in the reference system. Prior to scanning of the substrate surface 16 using the probe tip 18 of each of the probe heads 17, the probe heads are placed onto the encoder 12 by means of the extendible arm 11 and the positioning actuator 10.

In FIG. 1, the substrate holder 5 is illustrated in the lowered position: in the position wherein the scanning of the substrate surface 16 by the probe tips 18 may take place.

However during placement of the probe heads 17 on the encoder surface 12, the substrate holder 5 will be moved in an upward position such as to allow the placement of the heads 17 using the extendible arm 11.

Once the lowering of the substrate holder 5 has been performed accurately, the substrate holder 5 is moved by scanning arm 6 in a scanning motion relative to encoder surface (and thereby the probe tips 18 of the probe heads 17), to perform the scanning of the substrate surface 16. Accurate control of all movements performed by the actuators 7, and 10 will be controlled by controller 32 of the scanning probe microscopy control system 30. The control system 30 further comprises a memory 35 and a communications module 36 both connected to the controller 32 in a functional manner. Data obtained using the tip position detectors 21 of each probe head 17 is communicated to the communications module 36 of the control system 30. This measurement data is stored in memory 35, or may be forwarded onto a communications network for further processing remotely. Communication between the communications module 36 and each of the tip position detectors may comprise a wireline connection (not shown) or a wireless data communication connection. As will be appreciated, for sending the data wirelessly, the probe head 17 may further comprise a wireless data communication module installed onboard. According to an aspect of the invention 40 a scannable encoder structure 40 is fixed relative to the substrate surface and dimensioned to allow for measuring placement deviations of the probe tip 18 relative to the probe head 17. As will be further elucidated with reference to FIG. 3, the scannable structure preferably forms a fiducial pattern of a grid of fiducial marks in said one or more dimensions; said grid dimensioned to allow for measuring placement deviations of the probe tip relative to the probe head 17 by identifying one or more fiducial marks in the fiducial pattern. Preferably, the scannable structure is scannable by said probe tip and said structure forming, but also other scanning means, such as a laser may be used, that is e.g. arranged for scanning a fiducial mark and measuring the probe tip X and Y coordinate. The resulting image is decoded so that position coordinates can be extracted from this. When scannable by the probe tip 18, several material properties may be used for obtaining a coded scanning signal, e.g. a coding provided by provided by varying a local stiffness, magnetic or material type property. Other properties can also be used, e.g. topography, surface potential, hardness, material type. While the scannable structure 40 is shown fixed to the substrate holder 5; it may also integral part of the substrate, e.g. it may be provided as a scannable pattern in silicon. It may also be a separate (silicon) substrate attached to the substrate holder 5.

Figure 2:
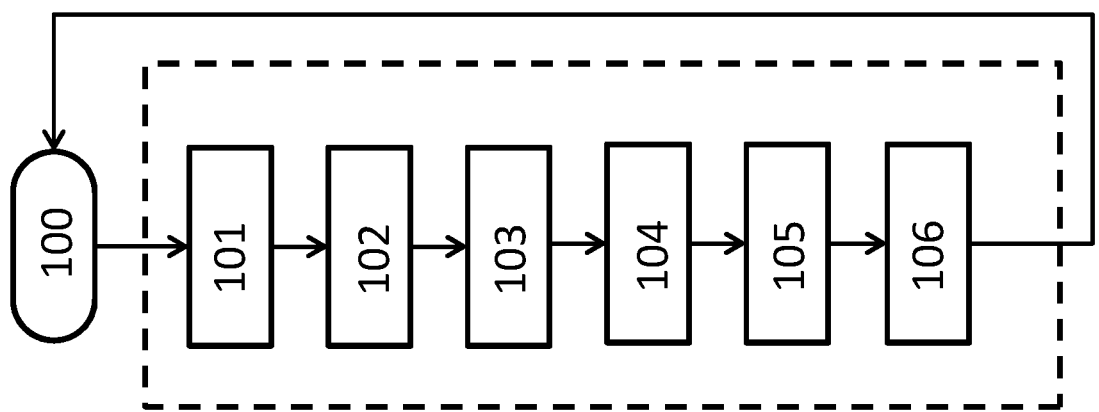
FIG. 2 shows a method flow for using the encoder structure.

FIG. 2 shows a method flow for using the encoder structure 40 e.g. as shown in FIG. 1, for finding back a previously measure spot after tip change or angle change. This method requires a displacement encoder for encoding a displacement of said probe tip in one or more directions that the substrate holder moves relative to the sample tip, so that its position is known through a separate set of displacement encoders or sensors. In a first step 101, after a scanning action 100 with a probe tip in a specific setting or orientation, the scan is finished at a scanning position of the probe tip relative to the substrate. In this position, it is aimed that the probe tip is changed in orientation or even replaced. To allow for this, in a second step 102 the probe head is moved to the fiducial pattern (e.g. element 40 of FIG. 1) to scan a first fiducial mark in the grid of fiducial marks at a first encoder position value. This first fiducial mark thus codes a first absolute position of the probe tip. In step 103 the probe tip is changed, that is, the orientation of the probe tip may be changed or the probe tip may be interchanged; so that the tip position is altered relative to the probe head 17. In step 104, after changing the tip; the probe head is again positioned relative to the fiducial pattern, with the probe head at a first encoder position value. In step 105 a second fiducial mark is scanned in the grid of fiducial marks while holding the probe head at the first encoder position value. This second fiducial mark codes a second absolute position of the probe tip. The difference between the first and second absolute positions is provided to the displacement encoder. In a step 106 the probe head is moved over a second encoder position value that is the first encoder position value, corrected by the distance of the second fiducial mark relative to the first fiducial mark. The method flow ends by resuming the scanning action 100 at the exact position where the probe tip initially finished scanning.

Figure 3:
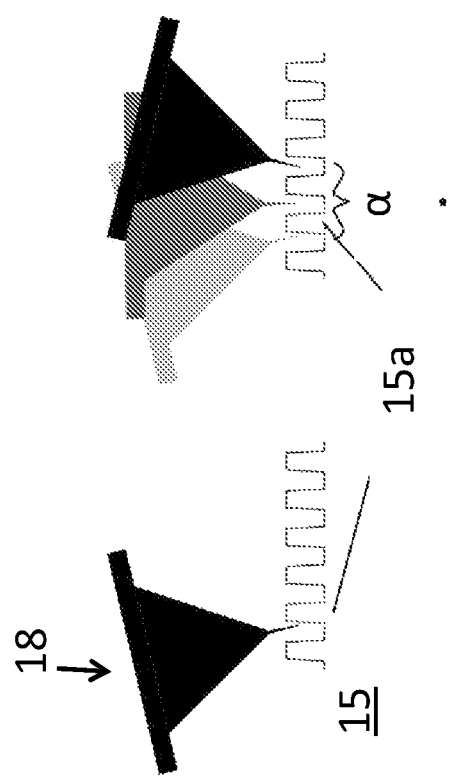
FIG. 3 shows a method where a single scannable structure.

FIG. 3 shows a method where a single scannable structure 15a on substrate 15 is scanned under different angles. By scanning under different angles, the structure 15a can be analyzed in three dimensions. However, in the execution, the probe tip needs to be rotated to various angles α, e.g. a right angle of e.g. 2-45 degrees relative to the normal of the substrate; a top (flat) angle coinciding with the normal; and a left angle of 2-45 degrees relative to the normal of the substrate 15. As the rotation of the probe tip 18 cannot be executed in situ, the probe tip 18 is moved to the fiducial pattern, where probe tip rotation is carried out. During rotation, the probe tip may not exactly coincide with the end-point of the original probe tip position. It can be shifted in a lateral way, and by scanning the fiducial pattern, the lateral placement can be measured and compensated for when moving the tip back to the structure 15a.

Figure 4:
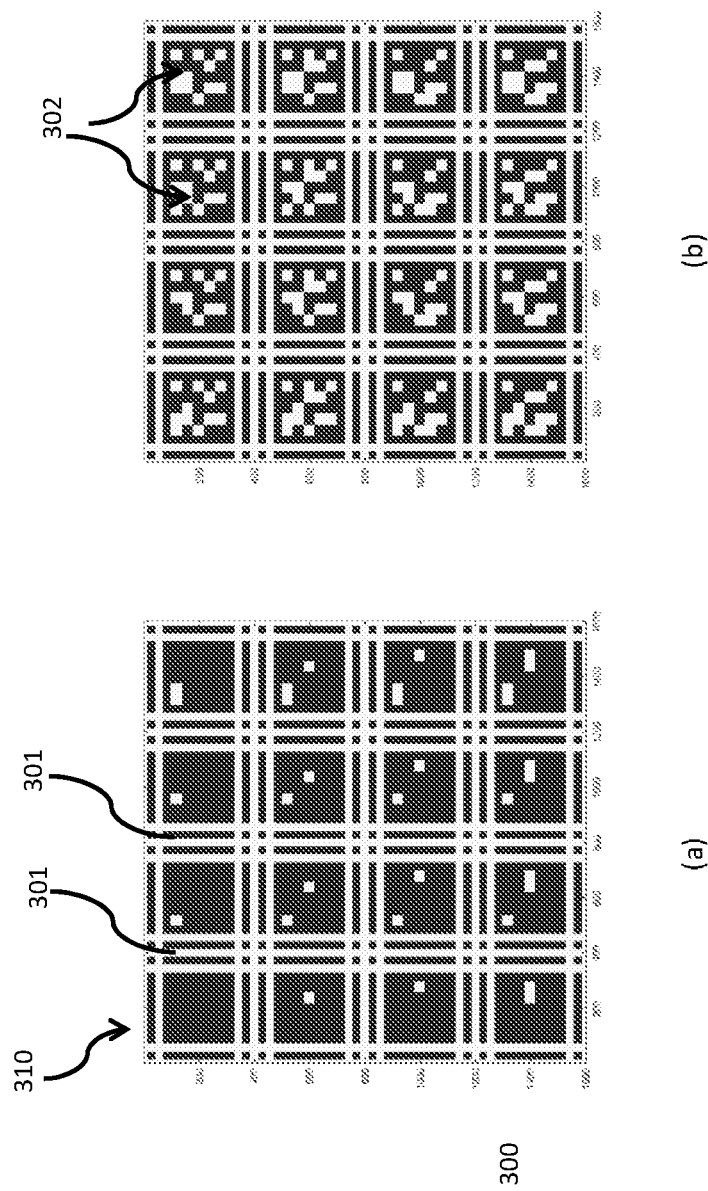
FIG. 4(a and b) shows an illustrative example of an absolute encoder structure.

FIG. 4 shows an illustrative example of an absolute encoder structure 300, that may be a per se known QR coding mechanism for coding an X and Y coordinate in the QR code.

The structure forms a grid 310 of fiducial marks 301, each coded with an X and Y code 302. For example for X-coding and Y-coding, 12 bits can be available, so that $2^{12}$ points can be coded in both X- and Y-directions. The code size may be e.g. 5×5 blocks, and the coding may be provided in a patterning of diamond, silicon etc. The blocks may be provided with an additional orientation mark; e.g. a dot in one of the corner angles of the marks 301; so that it is clear how to interpret the least significant bit.

The grid spacing may e.g. be 500 nm; where sub-pitch navigation accuracy can be achieved by determining where the center of the QR-code is situated within an AFM scan of the code. E.g. In the example, the top-left most QR-bit is the least significant bit for X, the QR-bit immediately to the right of the center is the least significant bit of Y. More specifically, FIG. 4a shows a QR-code sample proposal for reproducible navigation, starting with (X,Y)=(0,0). FIG. 4b shows the coding starting with (X,Y)=(1235,2346). The coded patterns 302 signify the corresponding bits. The fiducial mark 300 may not be a visual mark, but may simply be scannable by using the material properties that can be detected by the AFM probe head. It may be completely buried under a non-transparent capping layer. The mark 300 may be combined with a visual mark that may partly overlap the fiducial mark, and that may be suitable for (initial) alignment purposes. E.g. a visual mark may be provided by reflective material, for example aluminum stripes that are coated on the fiducial, in a layer thickness e.g. below 50 nm (e g 30 nm). The reflective material may be covered by a transparent material, wherein the QR code is provided; for example with a common origin with the visual mark. The transparent material may be first flattened by CMP polishing. The fiducial pattern may be provided with additional functionality; such as high aspect ratio test structures that may be used for calibration and characterization.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. A method of performing scanning probe microscopy on a substrate surface using a scanning probe microscopy system, the system including at least one probe head, the probe head comprising a probe tip arranged on a cantilever and a tip position detector for determining a position of the probe tip along a z-direction transverse to a scanning plane, the method comprising:
    moving the probe tip and the substrate surface relative to each other in one or more directions parallel to the scanning plane to position the probe tip at a scanning position on the substrate surface using the probe tip;
    measuring, by a displacement encoder, a displacement of said probe tip in said one or more directions, wherein the displacement encoder measures a distance of the probe tip relative to at least one of the group consisting of: a surface of a metrology frame, a surface that is statically connected to a metrology frame, and a two-dimensional optical encoder surface; and
    providing a scannable encoder structure fixed relative to the substrate surface and having coded X and Y coordinates, wherein the scannable encoder structure is dimensioned for measuring placement deviations of the probe tip relative to the probe head.

2. The method according to claim 1 wherein the scannable encoder structure forms a fiducial pattern of a grid of fiducial marks in said one or more dimensions; and wherein said grid is dimensioned for measuring placement deviations of the probe tip relative to the probe head by identifying one or more fiducial marks in the fiducial pattern.

3. The method according to claim 1, wherein said scannable encoder structure is scannable by said probe tip.

4. The method according to claim 1, wherein the scannable encoder structure is provided by varying at least one of the group consisting of: a local stiffness, a magnetic property, and a material type property.

5. The method according to claim 1, wherein the scannable encoder structure is fixed to the substrate holder.

6. The method according to claim 1, wherein the scannable encoder structure is provided on a silicon substrate.

7. The method according to claim 1, wherein said moving the probe tip and the substrate surface relative to each other is performed by the probe head comprising an actuator for moving the cantilever relative to the probe head in a direction parallel to the scanning plane for performing the scanning of the substrate surface.

8. The method according to claim 1, wherein the method comprises:
    finishing a scan at the scanning position;
    moving the probe head to the fiducial pattern to scan a first fiducial mark in the grid of fiducial marks at a first encoder position value;
    changing the probe tip;
    scanning a second fiducial mark in the grid of fiducial marks; while holding the probe head at the first encoder position value; and
    resuming scanning at the scanning position by moving the probe head over a second encoder position value that is the first encoder position value, corrected by a distance of the second fiducial mark relative to the first fiducial mark.

9. A scanning probe microscopy system for performing scanning probe microscopy on a substrate surface using a scanning probe microscopy system, the system including:
    a substrate holder for clamping the substrate;
    a probe head comprising a probe tip arranged on a cantilever and a tip position detector for determining a position of the probe tip along a z-direction transverse to a scanning plane defined by the substrate holder,
    an actuator for moving the probe tip and the substrate holder relative to each other in one or more directions parallel to the scanning plane to position the probe tip at a scanning position on the substrate surface using the probe tip;
    a displacement encoder for measuring a displacement of said probe tip in said one or more directions wherein the displacement encoder measures a distance of the probe tip relative to at least one of the group consisting of: a surface of a metrology frame, a surface that is statically connected to a metrology frame, and a two-dimensional optical encoder surface; and
    a fiducial pattern fixed relative to the substrate holder, wherein said fiducial pattern has a scannable structure that is scannable by said probe tip, wherein said scannable structure forms a grid of fiducial marks in said one or more dimensions; wherein said grid has coded X and Y coordinates and is dimensioned for measuring placement deviations of the probe tip relative to the probe head by identifying one or more fiducial marks in the fiducial pattern.

10. The system according to claim 9, wherein the scannable structure has at least one property for facilitating detecting a coded fiducial mark taken from the group consisting of: a varying local stiffness, magnetic property, and a material type property.

11. The system according to claim 9, wherein the scannable structure is provided on a silicon substrate.

12. The system according to claim 9, wherein the scannable structure comprises a visual mark.

13. The system according to claim 9, wherein the scannable structure comprises a orientation mark that facilitates identifying an orientation of the scannable structure relative to the probe tip.

14. The system according to claim 9, further comprising an actuator for moving the cantilever relative to the probe head in a direction parallel to the scanning plane for performing the scanning of the substrate surface.

15. The scanning probe microscopy system according to claim 9, further comprising an actuated substrate holder arranged for holding the substrate surface and for moving of the substrate surface in a direction parallel with the scanning plane for performing said scanning of the substrate surface using the probe tip.

16. The system according to claim 9, further comprising a controller arranged to carry out:
   finishing a scan at the scanning position;
   moving the probe head to the fiducial pattern to scan a first fiducial mark in the grid of fiducial marks at a first encoder position value; and,
   in accordance with changing the probe tip, further performing: scanning a second fiducial mark in the grid of fiducial marks; while holding the probe head at the first encoder position value; and
   resuming the scanning position by moving the probe head over a second encoder position value that is the first encoder position value, corrected by the distance of the second fiducial mark relative to the first fiducial mark.

* * * * *